(12) United States Patent
Morgan

(10) Patent No.: US 10,480,892 B2
(45) Date of Patent: Nov. 19, 2019

(54) SYSTEM AND METHOD FOR TIMING FIREARM PRACTICE DRILLS

(71) Applicant: Benjamin J Morgan, Colorado Springs, CO (US)

(72) Inventor: Benjamin J Morgan, Colorado Springs, CO (US)

(*) Notice: Subject to any disclaimer, the term of this patent is extended or adjusted under 35 U.S.C. 154(b) by 265 days.

(21) Appl. No.: 15/280,617

(22) Filed: Sep. 29, 2016

(65) Prior Publication Data

US 2017/0082390 A1 Mar. 23, 2017

Related U.S. Application Data

(63) Continuation-in-part of application No. 15/018,513, filed on Feb. 8, 2016, now abandoned, which is a continuation-in-part of application No. 14/848,856, filed on Sep. 9, 2015, now abandoned.

(60) Provisional application No. 62/068,667, filed on Oct. 25, 2014.

(51) Int. Cl.
| | |
|---|---|
| *F41A 33/00* | (2006.01) |
| *F42B 8/08* | (2006.01) |
| *H04B 1/04* | (2006.01) |
| *F42B 12/36* | (2006.01) |

(52) U.S. Cl.
CPC ............... *F41A 33/00* (2013.01); *F42B 8/08* (2013.01); *H04B 1/04* (2013.01); *F42B 12/365* (2013.01)

(58) Field of Classification Search
CPC .......... F41A 33/00; F41A 33/02; F41A 33/04; F41A 33/06; H04B 1/04; F42B 8/08; F42B 12/365
See application file for complete search history.

(56) References Cited

U.S. PATENT DOCUMENTS

| | | | | |
|---|---|---|---|---|
| 6,188,742 B1* | 2/2001 | Schousek | ............... | G01D 21/00 377/19 |
| 8,267,691 B1* | 9/2012 | Ferris | ................. | F41H 13/0025 434/11 |
| 8,287,437 B1* | 10/2012 | Rovere | ............... | A63B 69/004 473/444 |
| 8,646,201 B2* | 2/2014 | Hughes | .................. | F41A 33/02 42/1.01 |
| 2011/0281243 A1* | 11/2011 | Uhr | ........................ | F41A 33/00 434/16 |
| 2013/0337415 A1* | 12/2013 | Huet | ........................ | F41G 3/26 434/21 |

* cited by examiner

*Primary Examiner* — Timothy A Musselman
(74) *Attorney, Agent, or Firm* — Thorpe North & Western LLP

(57) ABSTRACT

A firearm training system includes a practice barrel assembly. The practice barrel assembly is configured and dimensioned to replace the factory barrel of the firearm. The practice barrel assembly includes a processor, a radio transmitter, a firing pin strike sensor and a rechargeable battery. The processor is in wireless communication with an electronic device, such as a smart phone. To initiate a practice drill, the electronic device provides a start signal to the user and, simultaneously, an electronic timer is started. In response to the start signal, the user performs a practice drill that includes a dry fire of the firearm. The firing pin strike sensor detects the dry fire of the firing pin, which causes the stop of the electronic timer. The electronic device then displays the elapsed time between the start signal and the stop of the electronic timer.

19 Claims, 18 Drawing Sheets

148

START ALERT

BEEP

VIBRATE

BOTH

START DELAY 10 seconds 5 seconds 3 seconds

152

| date | recorded time ( sec:mil ) |
|---|---|
| 06.01.15 | 01:0400 |
| 06.01.15 | 01:1000 |
| 06.01.15 | 01:0100 |
| 06.01.15 | 01:1000 |
| 06.01.15 | 01:0100 |
| 06.01.15 | 01:0200 |
| 06.01.15 | 01:0101 |
| 06.01.15 | 01:0525 |
| 06.01.15 | 01:0120 |
| 06.01.15 | 01:0102 |
| 05.29.15 | 00:0995 |
| 05.29.15 | 01:0400 |
| 05.29.15 | 01:0015 |
| 05.29.15 | 01:0002 |

| | best recorded time |
|---|---|
| 05.29.15 | 00:0995 |
| | average recorded time |
| 05.29.15 | 00:0995 |

154

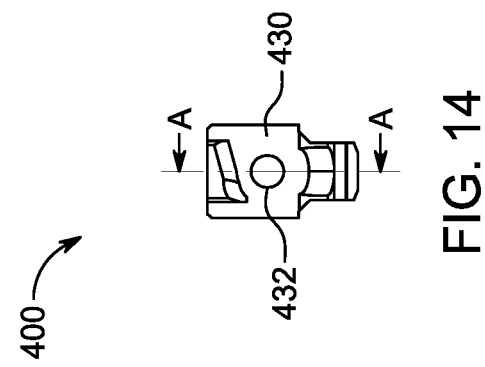
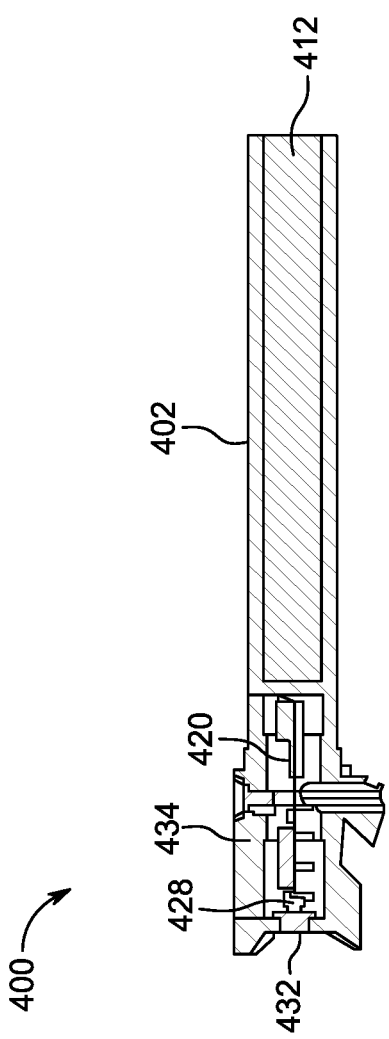
FIG. 14
FIG. 15

US 10,480,892 B2

SYSTEM AND METHOD FOR TIMING FIREARM PRACTICE DRILLS

CROSS-REFERENCE TO RELATED APPLICATIONS

This application is a continuation in part of U.S. patent application Ser. No. 15/018,513 filed on Feb. 8, 2016, which application is a continuation in part of U.S. patent application Ser. No. 14/848,856 filed on Sep. 9, 2015 which application claims the benefit of U.S. Provisional Application No. 62/068,667, filed Oct. 25, 2014, which are all hereby incorporated by reference herein in their entirety.

STATEMENT REGARDING FEDERALLY SPONSORED RESEARCH OR DEVELOPMENT

Not Applicable.

BACKGROUND OF THE INVENTION

1. The Field of the Invention

The present invention relates generally to firearms training and practice, and more particularly, but not necessarily entirely, to electronic systems, methods and devices that measure an elapsed time of firearm practice drills.

2. Description of Related Art

Firearm practice drills offer shooters a proven way to improve their firearm handling skills. Practice drills may vary depending on the type of firearm and the needs of the shooter. One popular practice drill is the quick-draw drill that requires that the shooter draw the firearm from a holster and then shoot at a target. Another popular drill is a reload drill which requires the shooter to reload the firearm and then shoot at a target. Other practice drills are known as well that end with the shooter firing a live round at a target.

In the past, handheld shot timers have been used in firearm training and, in particular, they have been used to time practice drills. The basic function of shot timers is to provide an audible start signal and then record the time from the start signal to the actual shot. For example, a quick-draw drill may include a shooter standing ready and then, upon hearing the audible start signal provided by the shot timer, draw the firearm and shoot a live round at a target. The shot timer will then display the elapsed time between the start signal and the shot. The shot timer may detect the shot by monitoring for the audible report of the bullet being fired from the firearm. Thus, it is understood that presently available shot timers require the use of live ammunition. Further, shot timers are typically held by a second person that stands near the shooter during the practice drill.

Despite the advantages of known shot timers for firearm practice drills, improvements are still being sought. For example, many of the shot timers disadvantageously require the use of live ammunition as well as a second person to perform the actual timing. It would be an advantage to provide a shot timer system and method that allows a shooter to reliably time practice drills without the need for live ammunition or a second person to perform the timing. The prior art is thus characterized by several disadvantages that are addressed by the present invention. The present invention minimizes, and in some aspects eliminates, the above-mentioned failures, and other problems, by utilizing the methods and structural features described herein.

The features and advantages of the invention will be set forth in the description which follows, and in part will be apparent from the description, or may be learned by the practice of the invention without undue experimentation. The features and advantages of the invention may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which:

FIG. 3C is an exemplary user interface for display on the electronic device according to an embodiment of the present disclosure;

FIG. 14 is a rear view of the practice barrel assembly shown in FIG. 11; and

FIG. 15 is a cross sectional view of the practice barrel assembly shown in FIG. 11 along the section A-A shown in FIG. 14.

DETAILED DESCRIPTION

Figure 1:
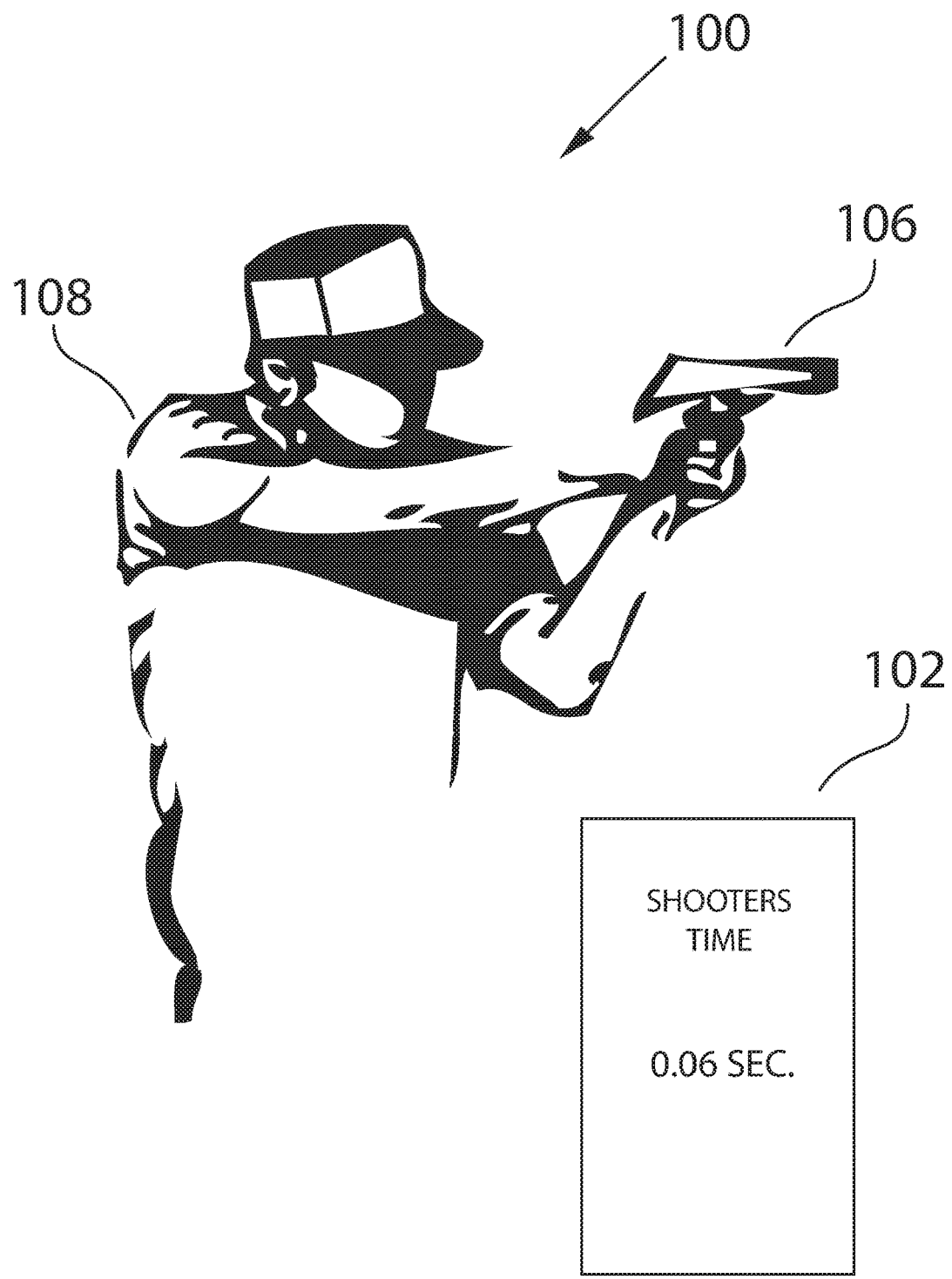
FIG. 1 is a diagram of a system for performing firearm training drills according to an embodiment of the present disclosure.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

In describing and claiming the present disclosure, the following terminology will be used in accordance with the definitions set out below. As used in this specification and the appended claims, the singular forms "a," "an," and "the" include plural referents unless the context clearly dictates otherwise. As used herein, the terms "comprising," "including," "containing," "characterized by," "having," and grammatical equivalents thereof are inclusive or open-ended terms that do not exclude additional, unrecited elements or method steps. As used herein, the term "proximal" shall refer broadly to the concept of a nearest portion. As used herein, the term "distal" shall generally refer to the opposite of proximal, and thus to the concept of a further portion, or a furthest portion, depending upon the context.

Referring now to FIG. 1, there is depicted a firearm practice system 100 according to an embodiment of the present disclosure. The system 100 includes an electronic device 102 that is in wireless communication with a practice round 104 (not visible) that is loaded into a chamber of a firearm 106. A shooter 108, referred to hereafter as a "user," may use the electronic device 102 and the practice round 104 loaded in the firearm 106 to time firearm practice drills. In an embodiment, the electronic device 102 receives user input that causes the electronic device 102 to provide a start signal and, at the same time, start an electronic timing device. It will be appreciated that the electronic timing device may be located at the electronic device 102 or as part of the practice round 104 (not visible).

Upon perceiving the start signal from the electronic device 102, the user performs a firearm practice drill that ends with the user pulling the trigger such that the firing pin strikes the practice round 104 loaded in the chamber. Upon detecting the strike of the firing pin, the practice round 104 transmits a wireless signal to the electronic device 102. In response to the wireless signal from the practice round 104, the electronic device 102 stops the timer and displays the elapsed time. In this manner, the present disclosure provides a user with the ability to time firearm practice drills without using live ammunition. This is a benefit because the user is able to perform practice drills without the need to travel to a location that allows the use of live ammunition.

In an alternative embodiment, the electronic device 102 receives user input that causes the electronic device 102 to send a wireless start signal to the practice round 104. In response to the wireless start signal, the practice round 104 starts an electronic timer. Alternatively, the electronic timer may be located at the electronic device 102. The practice round 104 stops the electronic timer when the user pulls the trigger such that the firing pin strikes the practice round 104 loaded in the chamber. The practice round 104 will then transmit the elapsed time to the electronic device 102 where it is displayed to a user. The practice round 104 will store in memory all of the previously recorded times.

Each of these components of the system 100 is further described in detail below.

Electronic Device

Figure 2:
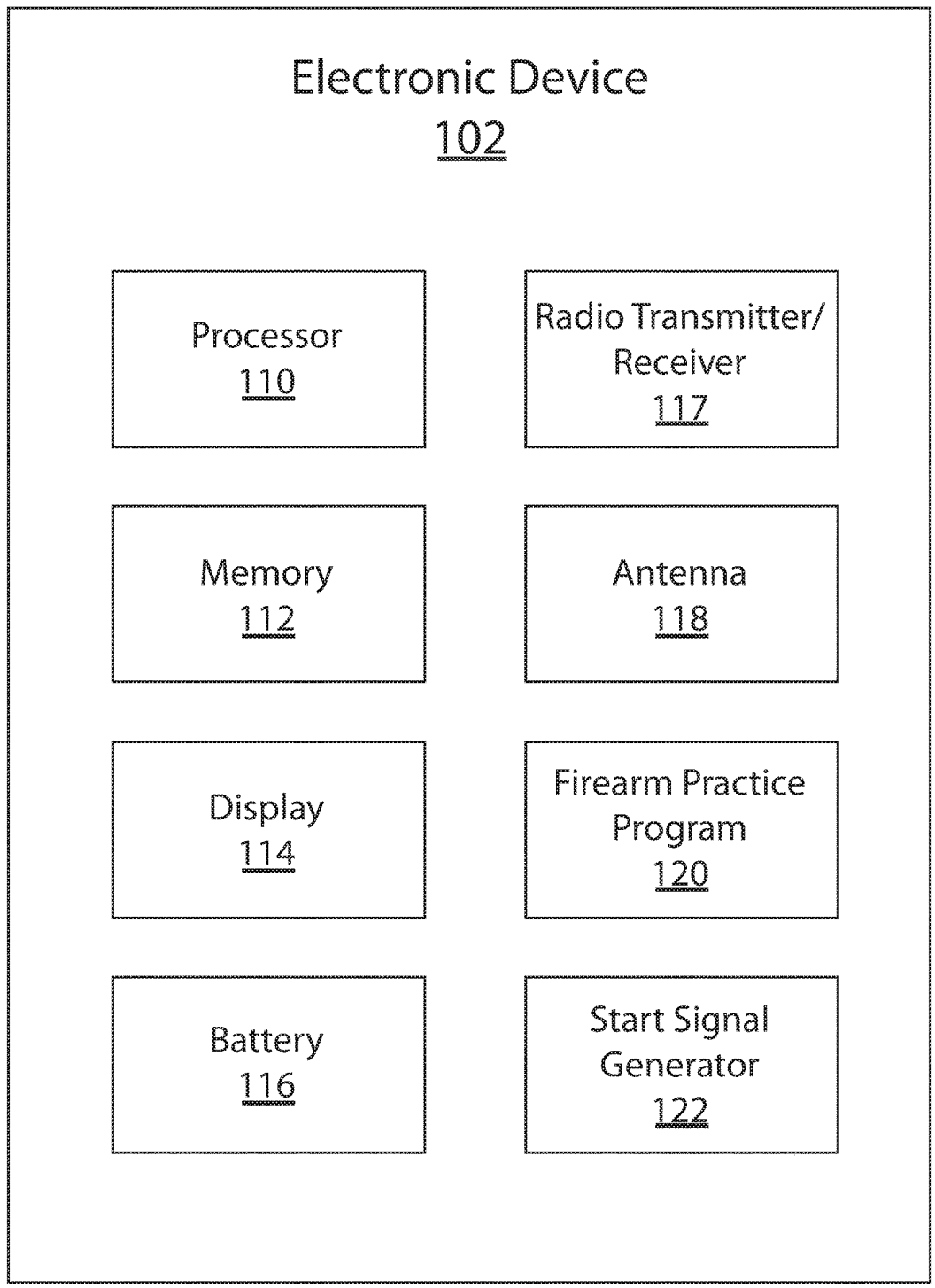
FIG. 2 is a diagram of an electronic device according to an embodiment of the present disclosure.

Referring now to FIG. 2, the electronic device 102 comprises a processor 110, a memory 112, a display 114, a battery 116, a radio transmitter/receiver 117, an antenna 118, a firearm practice program 120, and a start signal generator 122. It will be appreciated that the electronic device 102 may be a portable electronic device, such as a smartphone, laptop computer, an electronic pad, or even a processor-based music player or gaming device. Suitable forms of the electronic device 102 include iPhones®, iPads®, and the like. In an embodiment, the electronic device 102 is a dedicated device specifically tailored to perform the features and functionality described herein.

In an embodiment, the processor 110 is a microprocessor. In an embodiment, the processor 110 includes two or more processors. In an embodiment, the memory 112 may include RAM memory, ROM memory or any other type of electronic memory capable of storing computer programs for execution by processors. It will be further appreciated that the processor 110 and the memory 112 may be formed as a single unit or disparate units.

The firearm practice program 120 is stored in the memory 112 in a manner known to those of ordinary skill. The program 120 includes computer readable instructions, that when executed by the processor 110, cause the processor 110 to perform the functions described herein. The firearm practice program 120 may be downloaded from a computer server (not shown) over a network, such as the Internet, in a manner known to those of ordinary skill. In an embodiment, the program 120 is a computer application or "app" that is downloaded from an online app store, such as iTunes or Google Play. In an embodiment, the program 120 is downloaded to the electronic device 102 from a specific website on the Internet, such as a website associated with the manufacturer of the practice round 104. In an embodiment, the program 120 is downloaded from a USB drive or other portable storage device, such as a CD. In an embodiment, the program 120 is loaded into the memory 112 at the time of manufacture of the electronic device 102.

In an embodiment, the display 114 is a touch screen display as known to those of ordinary skill. The display 114 is operable to display a user interface that allows a user to interface with the processor 110 as it executes the program 120. In particular, the user interface on the display 114 allows the user to select options and features provided by the firearm training program 120 running on the processor 110. The user interface further allows the user to input data and view data calculated and provided by the processor 110 as will be described hereinafter. In an embodiment, the battery 116 is operable to provide power to the electronic device as known to those have ordinary skill. The radio 117 and antenna 118 allows the electronic device 102 to communicate using radio frequency transmissions with the practice round 104. More specifically, the radio 117 and the antenna 118 allows the processor 110 to receive a stop signal and other data from the practice round 104 as will be described in more detail hereinafter. The start signal generator 122 may generate a start signal that is perceived by a user in response to a signal generated by the processor 110. In an embodiment, start signal generator 122 comprises one or more of a speaker, a vibrator, or an electronic display.

Figure 3A:
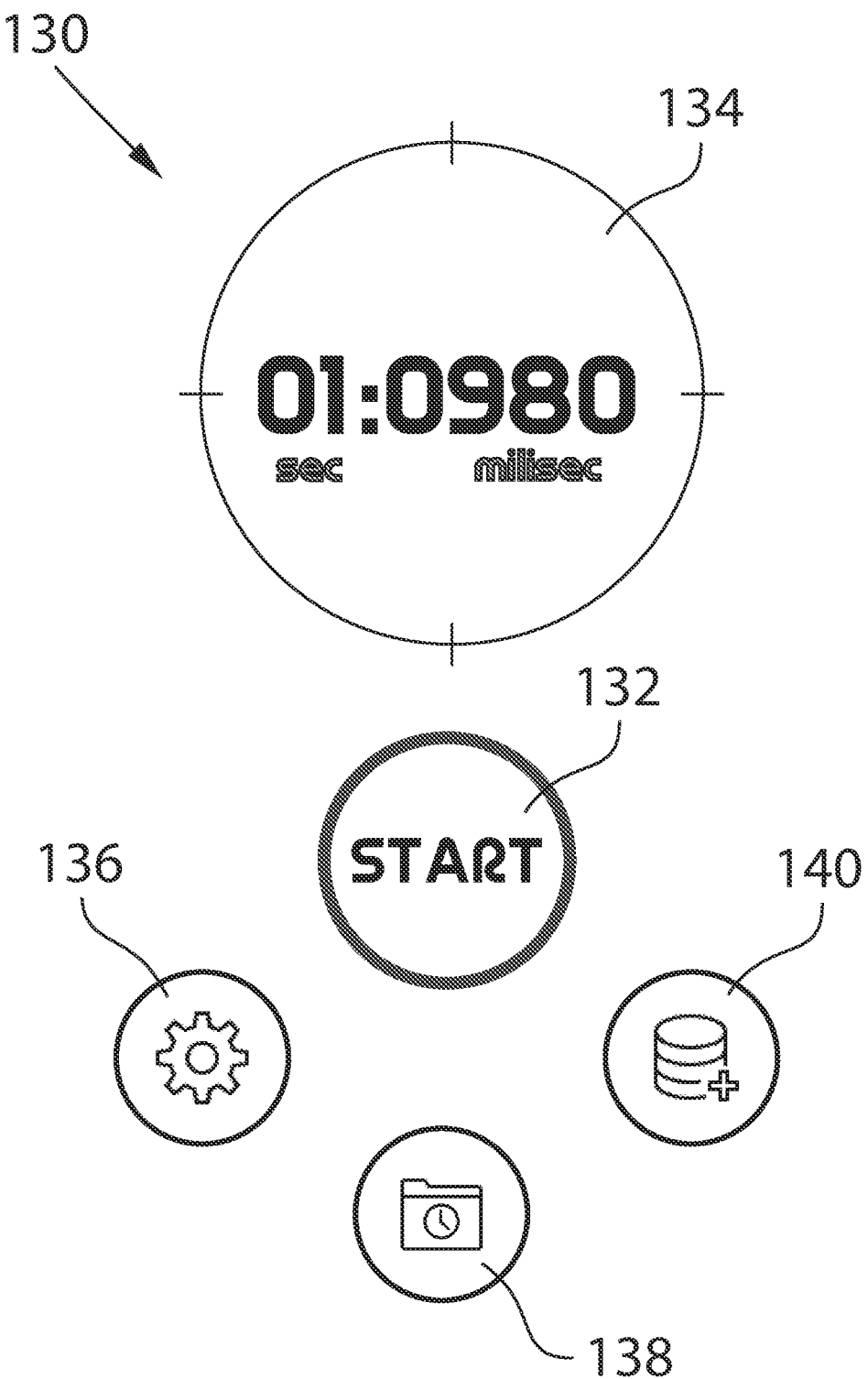
FIG. 3A is an exemplary user interface for display on the electronic device according to an embodiment of the present disclosure.

Referring now to FIGS. 3A-3F, there are depicted exemplary interfaces of the graphical user interface that is generated by the processor 110 for display to a user on the display 114 of the electronic device 102. Referring now to FIG. 3A, an interface 130 includes a start button 132. In response to a user selecting the start button 132, the processor 110 will generate a start signal and start an electronic timer on the processor 110 after an optional predetermined delay. The processor 110 will display the elapsed time in a time display frame 134 on the interface 130. The processor 110 will continue to run the timer until a wireless stop signal is received from the practice round 104, at which point the total elapsed time between the start signal and the stop signal, as calculated by the processor 110, is shown in the time display frame 134.

In an alternative embodiment, the electronic timer is located at the practice round 104. Accordingly, in response to a user selecting the start button 132 on the electronic device 102, the processor 110 will generate wireless start signal after a predetermined delay that is transmitted to the practice round 104. In response to receiving the wireless start signal, the practice round 104 starts the electronic timer. The practice round 104 stops the electronic timer in response to the firing pin of the firearm striking the practice round. The practice round 104 will then transmit the elapsed time to the electronic device 102 where it is displayed to the user. Thus, it will be appreciated that the electronic timer may be located either at the practice round 104 or the electronic device 102.

Figure 3B:
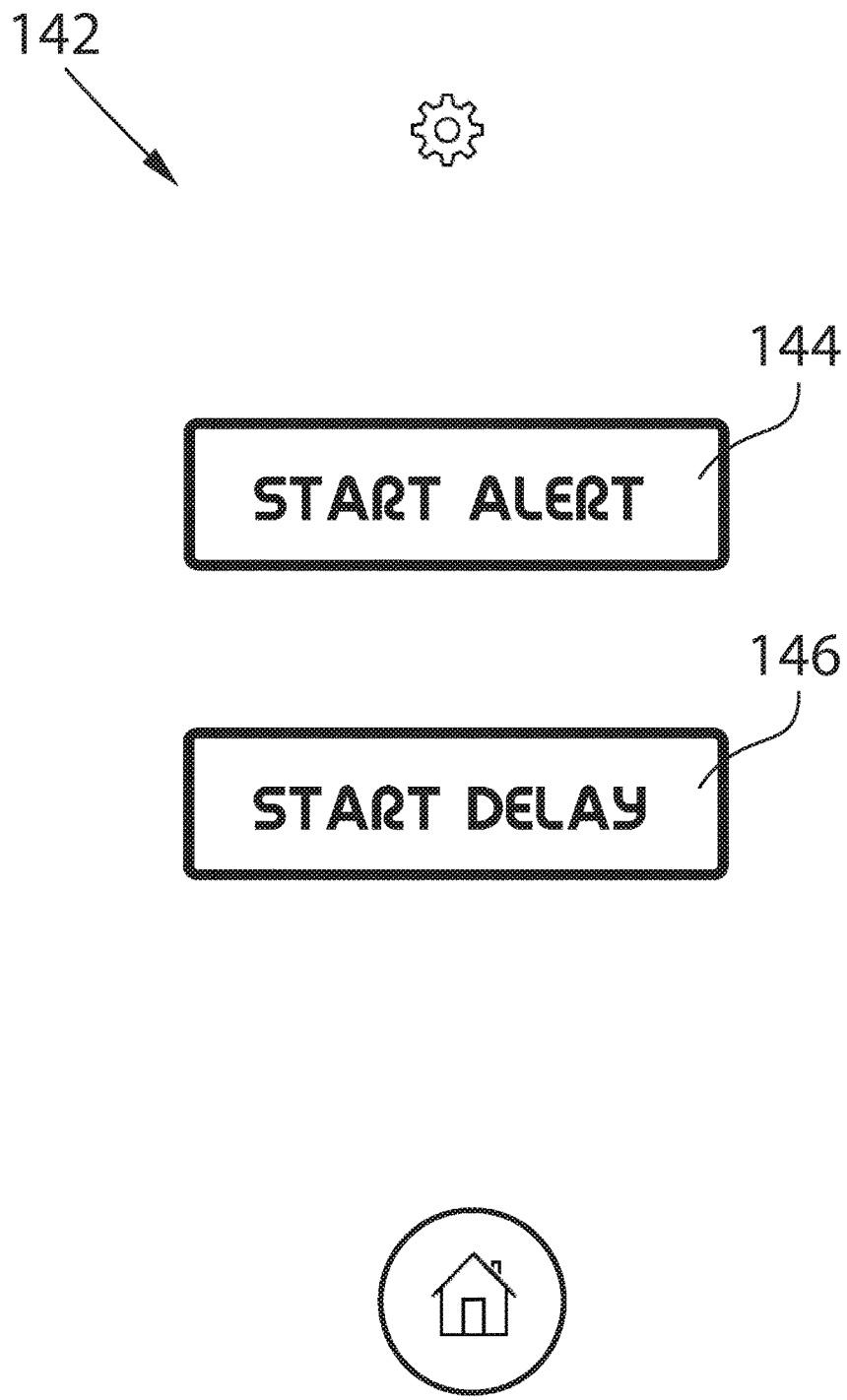
FIG. 3B is an exemplary user interface for display on the electronic device according to an embodiment of the present disclosure.
Figure 3C:
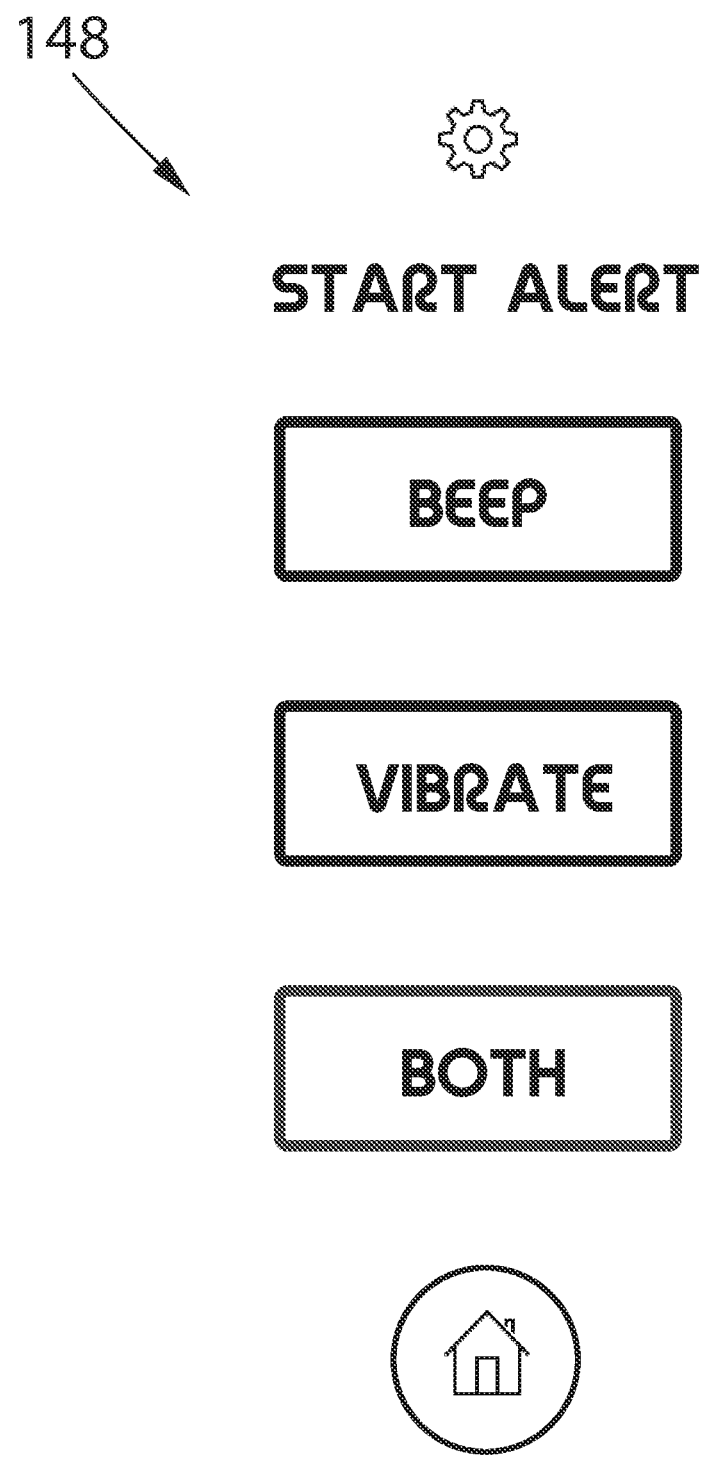
Figure 3D:
FIG. 3D is an exemplary user interface for display on the electronic device according to an embodiment of the present disclosure.
Figure 3D:
Figure 3D:
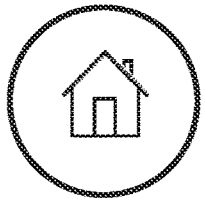

Still referring to FIG. 3A, the interface 130 further provides several menu options for user selection, including a settings button 136, a history button 138, and a connect button 140. In response to a user selecting the settings button 136, the processor 110 will generate an interface 142 as shown in FIG. 3B. The interface 142 provides two selectable options, a start alert button 144 and a start delay button 146. In response to a user selecting the start alert button 144, the processor 110 generates the user interface 148 as shown in FIG. 3C. The interface 148 allows a user to select the start signal generated by the start signal generator 122 of the electronic device 102. In an embodiment, the start signal is one of a beep, vibrate, or both. In response to a user selecting the start delay button 146 on the interface 142 as shown in FIG. 3B, the processor 110 generates an interface 150 as shown in FIG. 3D. The interface 150 allows the user to select a time delay between the user selecting the start button 132 (FIG. 3A) and the start signal generated by the start signal generator 122 of the electronic device 102. It will be appreciated that the start delay allows a user to select the start button 132 (FIG. 3A) and then set down the electronic device 102 and get ready for the start signal.

Figure 3E:
FIG. 3E is an exemplary user interface for display on the electronic device according to an embodiment of the present disclosure.
Figure 3E:
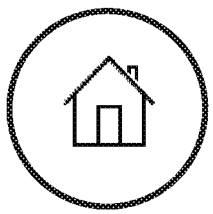
Figure 3F:
FIG. 3F is an exemplary user interface for display on the electronic device according to an embodiment of the present disclosure.
Figure 3F:
Figure 3F:
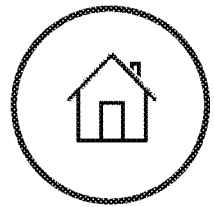

When a user selects the history button 138 on the interface 130 in FIG. 3A, the processor 110 generates an interface 152 as shown in FIG. 3E. The interface 152 allows a user to review all previous times recorded by the processor 110 and stored on the electronic device 102. When a user selects the connect button 140 on the interface 130 in FIG. 3A, the processor 110 generates an interface 154 as shown in FIG. 3F. The interface 154 allows a user to send a recovery signal to the practice round 104. In response to the recovery signal, the practice round 104 will transmit data to the electronic device 102. In an embodiment, the data transmitted to the electronic device 102 comprises a log of all times recorded at the practice round 104.

Practice Round

Figure 4:
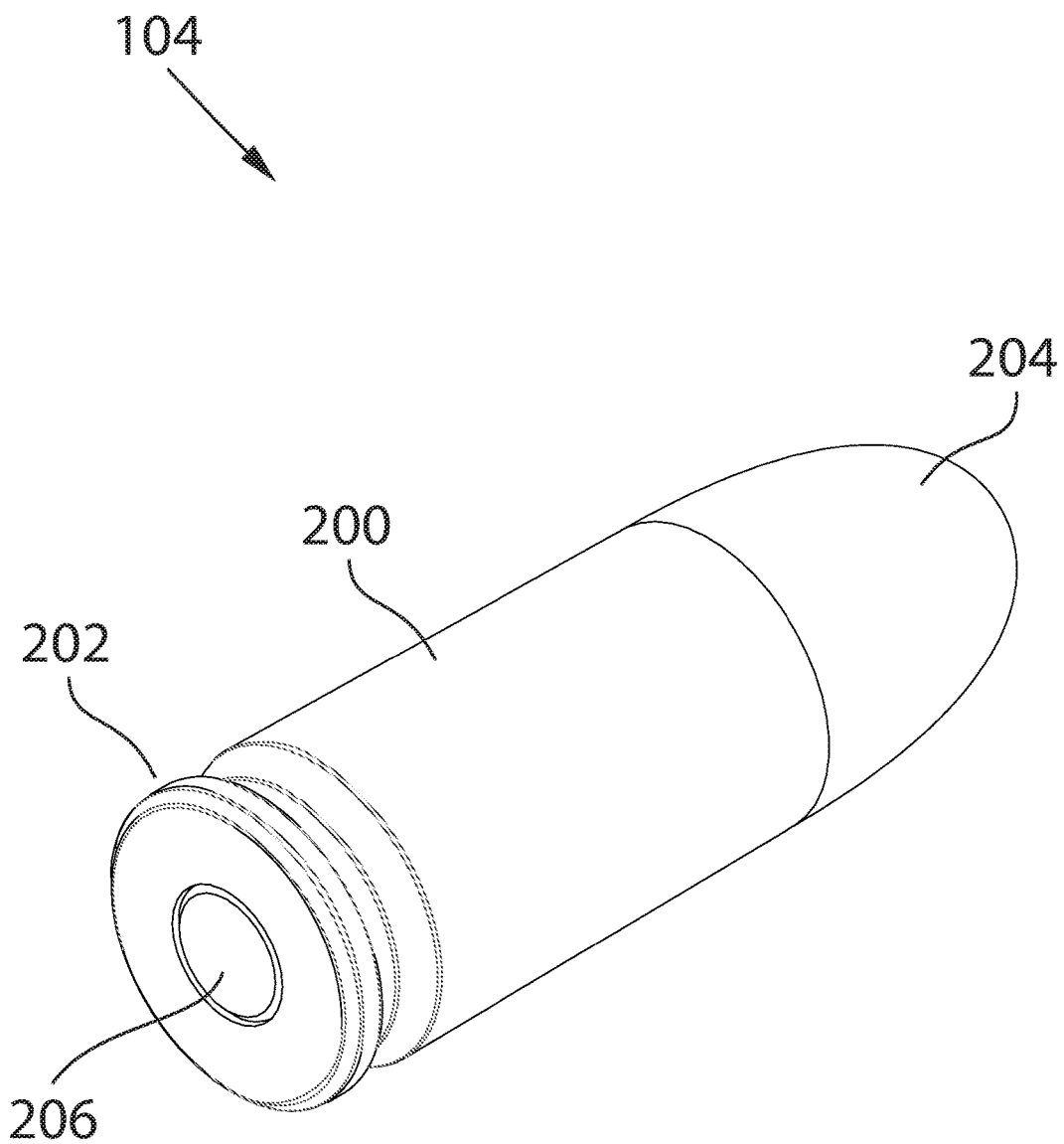
FIG. 4 is a perspective view of a practice round according to an embodiment of the present disclosure.
Figure 5:
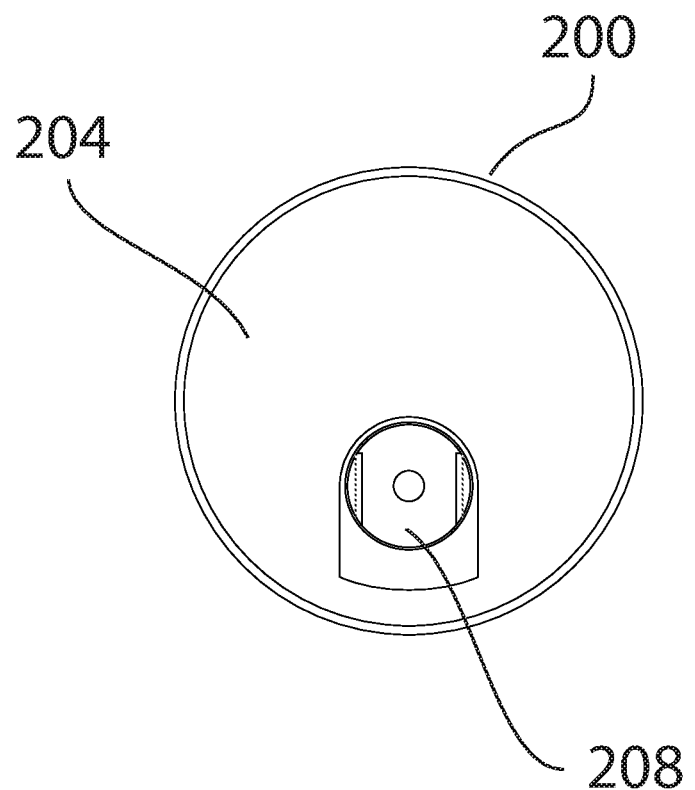
FIG. 5 is an end view of a practice round according to an embodiment of the present disclosure.
Figure 6:
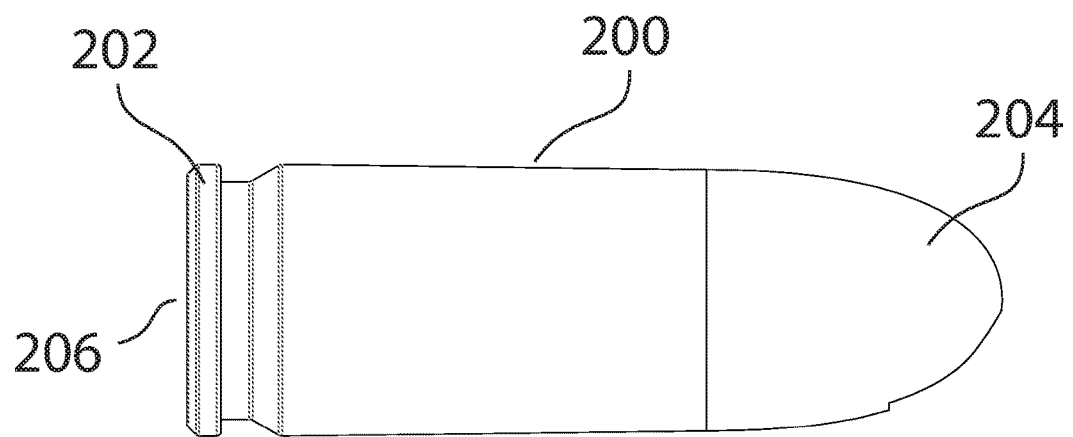
FIG. 6 is a side view of a practice round according to an embodiment of the present disclosure.

Referring to FIGS. 4, 5, and 6, as can be observed, the practice round 104 is dimensioned similar to a live round. However, the practice round 104 is completely inert, meaning that the practice round 104 does not, and cannot, fire a bullet. The practice round 104 may be configured and adapted to fit into the chamber of most firearms, including rifles and pistols. In this regard, the practice round 104 may be dimensioned to fit into a chamber of a particular caliber of firearm. In an embodiment, the practice round 104 is dimensioned to be utilized in one of the following calibers: .380 ACP, 9 mm, .38 special, .357 magnum, .40 S&W, .45 ACP, .44 magnum. It will be further appreciated that the practice round 104 may be dimensioned to fit in a firearm chamber of almost any caliber. The practice round 104 may include a casing 200 that extends from a proximal end 202 to a distal end 204. The proximal end 202 may include a flat proximal surface 206 adapted to receive a strike from a firing pin of a firearm while the round 104 is loaded into a chamber. As shown in FIG. 5, located in the distal end 204 of the practice round 104 is a charging port 208 for forming a connection with a power source to charge a battery located within the practice round 104.

Figure 7:
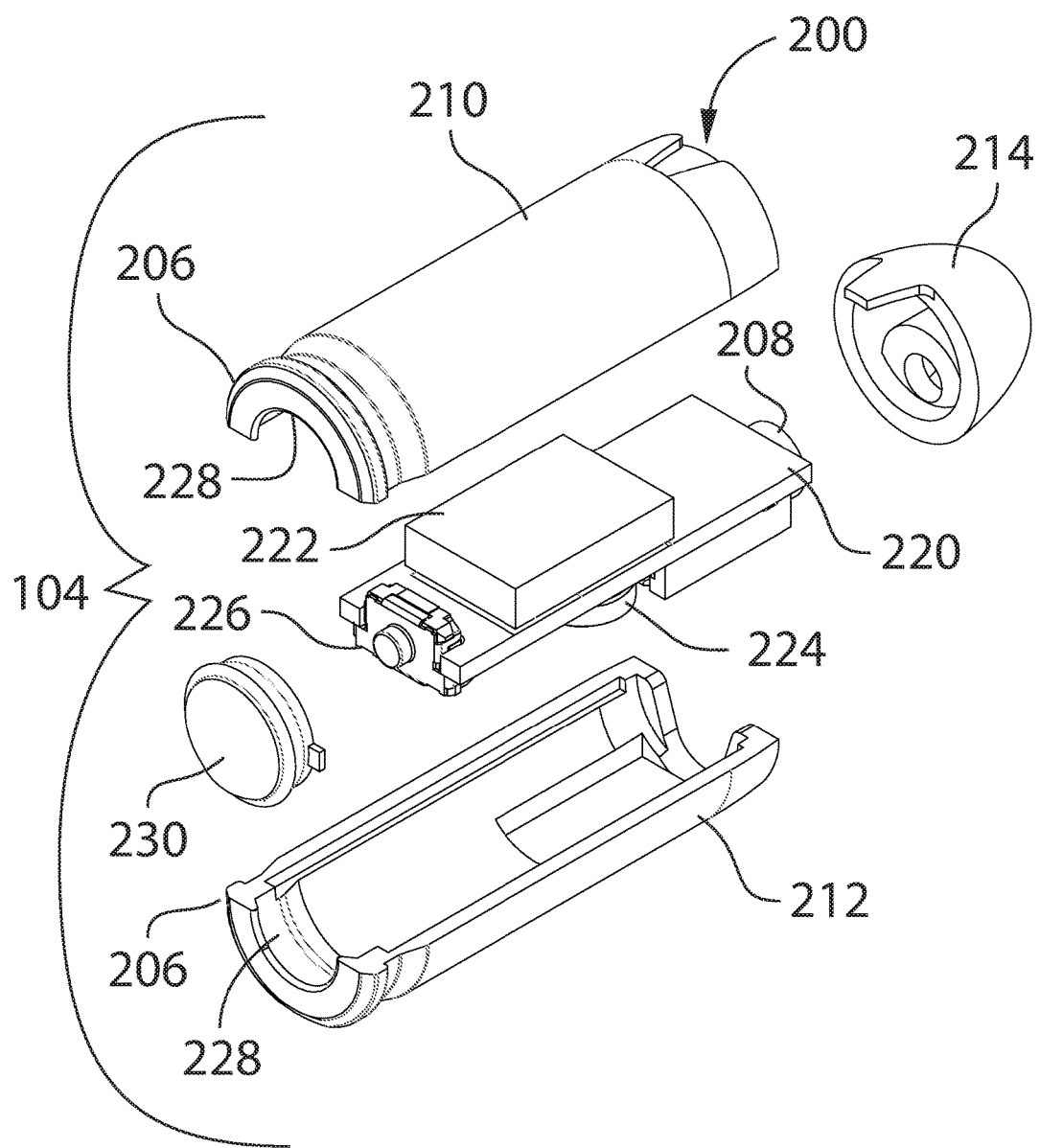
FIG. 7 is an exploded view of a practice round according to an embodiment of the present disclosure.
Figure 8:
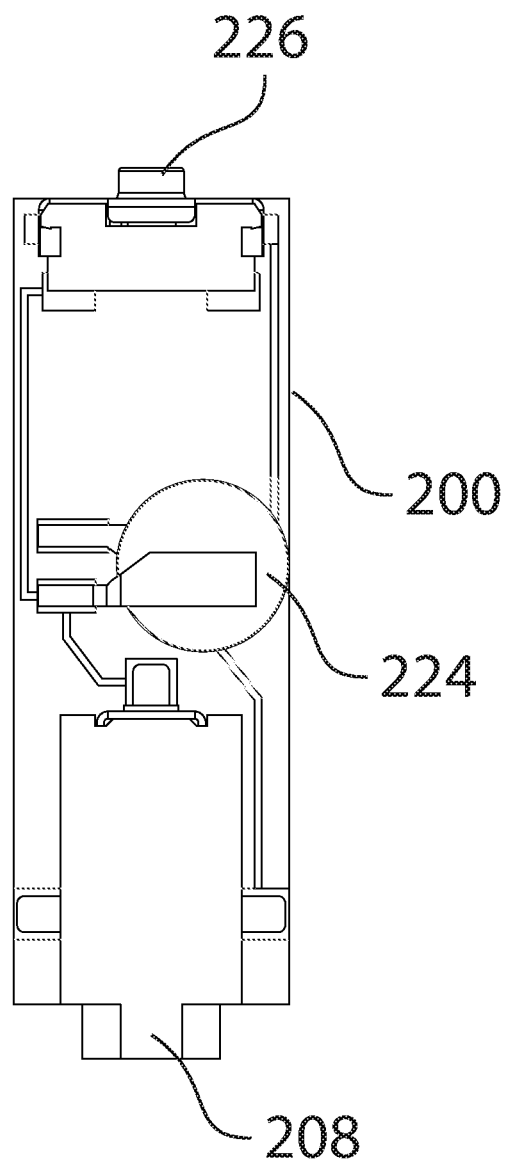
FIG. 8 is a top view of a circuit board for the practice round according to an embodiment of the present disclosure.
Figure 9:
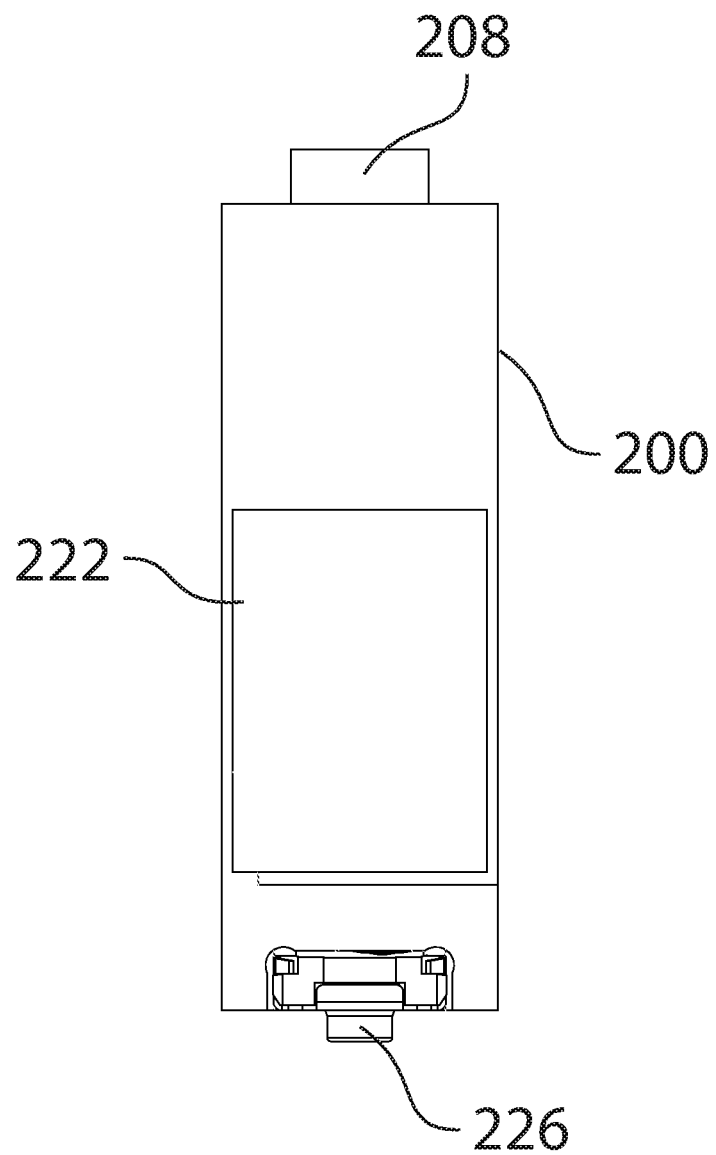
FIG. 9 is a bottom view of a circuit board for the practice round according to an embodiment of the present disclosure.

Referring now to FIG. 7, there is depicted an exploded view of the practice round 104. The casing 200 includes a top portion 210, a bottom portion 212, and a tip portion 214 that define an internal chamber within the casing 200. Disposed within the chamber are electronic components that enable the practice round 104 to receive and transmit a wireless signal to the electronic device 102. Referring to FIGS. 7, 8 and 9, a circuit board 220 is mounted within the chamber of the casing 200. The circuit board 220 may include a multi-functional processing module 222. In an embodiment, the module 222 incorporates an antenna, a radio transmitter and receiver, a processor, and a memory. Loaded in the memory is program having computer-readable instructions that cause the processor, when executing the instructions, to perform and provide the functions and features of the practice round 104 as described herein. A commercially available device suitable for use as the module 222 is the Simblee module by RF Digital. Connected to the circuit board 220 is also the charging port 208 which is operable to allow a battery 224 mounted on the board 220 to be charged. It will be appreciated that the battery 224 provides power to the components of the board 220.

Connected to the board 220 and in communication with the processor of the module 222 is a firing pin strike sensor 226. The sensor 226 may extend through an orifice 228 defined in the flat proximal surface 206 of the casing 200. It will be appreciated that the firing pin strike sensor 226 is located on the flat proximal surface 206 of the casing 200 in the conventional position of the primer for a live round. Thus, the firing pin strike sensor 226 is able to detect a strike of the firing pin of a firearm on the practice round 104. In an embodiment, the sensor 226 is a switch that is depressed in response to the strike of the firing pin. In an embodiment, the sensor 226 comprises a piezoelectric material. In an embodiment, the sensor 226 comprises a microphone. It will be appreciated that the sensor 226 is any sensor capable of detecting the strike of the firing pin. The sensor 226 may be protected by a flexible polyurethane member 230 that extends over the orifice 228 of the casing 200.

In response to the processor of the module 222 receiving a signal indicating that the firing pin of the firearm has struck the firing pin strike sensor 226, the module 222 transmits a wireless signal to the electronic device 102. In response to the receipt of the signal from the practice round 104, the electronic device 102 stops the electronic timer running on the electronic device 102. In an alternative embodiment, the module 222 stops an electronic timer running on the processor of the module 222 in response to a signal from the firing pin strike sensor 226. Thus, it will be appreciated that the signal from the firing pin strike sensor 226 may stop an electronic timer running locally on the practice round 104 or on the remote electronic device 102. If the electronic timer is local, the module 222 may store a log of all previously recorded times. The log may then be uploaded to the electronic device 102 from the practice round 104.

It will be appreciated that the practice round 104 and the electronic device 102 communicate using radio frequency signals. In an embodiment, the practice round 104 and the electronic device 102 communicate using a short-range wireless connection, such as the Bluetooth standard. In this regard, the practice round 104 and the electronic device 102 may be wirelessly paired to each other in a manner known to those of ordinary skill.

In an embodiment, an electronic timing device is disposed within the casing of the practice round 104. The electronic timing device may utilized the processor of the module 222 in order to start and stop an electronic timer. In an embodiment, the electronic timing device comprises the processor 110 of the electronic device 102. Thus, it will be appreciated that the electronic timing device may be incorporated into the components of the practice round 104 or the electronic device 102.

Figure 10:
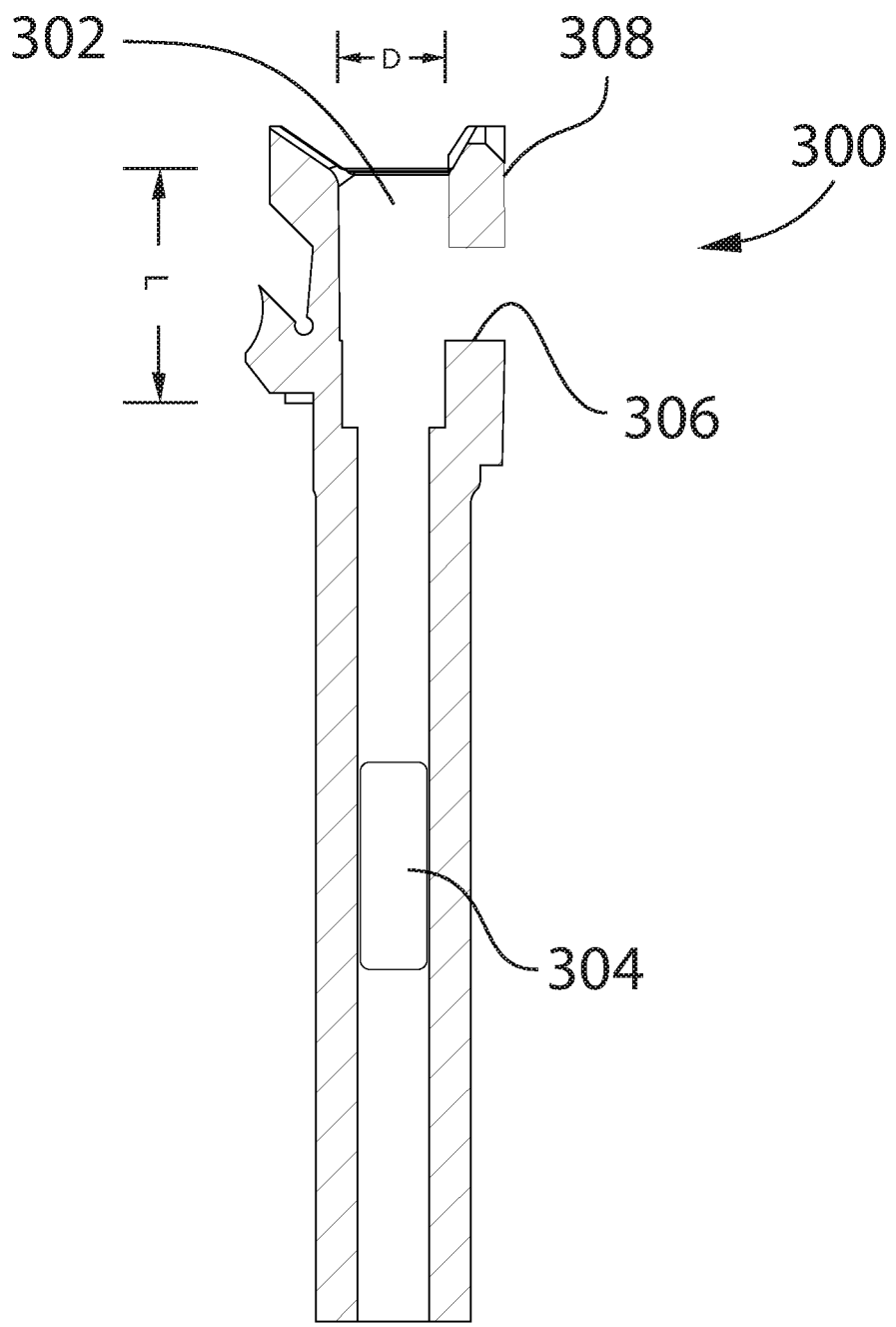
FIG. 10 is a side, cross sectional view of a practice barrel according to an embodiment of the present disclosure.

Referring now to FIG. 10, there is depicted a practice barrel 300 according to an embodiment of the present disclosure. The practice barrel 300 may be adapted to temporarily replace the real barrel of pistols of varying manufactures, calibers, and configurations when using a practice round 104. That is, the practice barrel 300 is interchangeable with the factory barrel of a real firearm. In an embodiment, the practice barrel 300 may be formed of a plastic, polymer or some other material that facilitates the transmission of radio signals between the practice round 104 and the electronic device 102. The barrel 300 may include a chamber 302 configured and adapted to receive a practice round 104.

In an embodiment, a length, L, of the chamber 302 and the practice round 104 may be shorter than the length of the chamber of the real barrel and a live round, respectively. It will be appreciated that this feature prevents a user from inserting a live round into the chamber 302 of the practice barrel 300. In an embodiment, a diameter, D, of the chamber 302 and the practice round 104 may be smaller than the diameter of the chamber of the factory barrel and a standard live round, respectively, in order to prevent a live round from being accidently loaded into the chamber 302 and fired. In an embodiment, the barrel 300 may be adapted to include steel or some type of metal plug 304 to simulate the weight and feel of a factory barrel. In an embodiment, the barrel 300 may comprise a bright color to indicate that the practice barrel 300 is installed.

In an embodiment, the practice barrel 300 may include one or more ports 306 that extend from an outer surface 308 to the chamber 302. It will be appreciated that the ports 306 may facilitate the transmission of radio signals between a practice round 104 loaded into the chamber 302 and an electronic device 102. In an embodiment, the practice barrel 300 is formed of metal.

In an embodiment, a radio transmitter may be loaded into the chamber 302. For example, the practice round 104 may be loaded into the chamber 302. In an embodiment, the radio transmitter may be integrally formed as part of the practice barrel 300. That is, the radio transmitter may be enclosed within the practice barrel 300 and not part of a practice round.

Below is a discussion of various practice drills that may be performed using the practice round 104, barrel 300, and an electronic device 102. It will be appreciated that the present disclosure may be utilized with any number of practice drills now known or known in the future.

Exemplary Practice Drill—Quick Draw

This drill provides a user with a time for drawing and firing the weapon. In this drill, the practice round 104 is loaded into the chamber of the firearm. On the start signal from the electronic device 102, the user draws the firearm and presses the trigger causing the firing pin to strike the practice round 104. The electronic device 102 then displays the time between the start signal and the firing pin striking the practice round 104.

Exemplary Practice Drill—Magazine Change

In this drill, the user starts with an empty magazine in the firearm with the slide (pistol) or bolt (rifle) locked to the rear. On the start signal from the electronic device 102, the user will press the magazine release and drop the empty magazine from the firearm. The user will retrieve a new magazine containing the practice round 104. This magazine will be placed in the magazine well of the firearm and the slide or bolt will be released, then the trigger will be pressed releasing the firing pin and giving the user an accurate time for the magazine change.

Exemplary Practice Drill—Malfunction Clearance

A weapons malfunction is a disruption in any of the eight cycles of function (feeding, chambering, locking, firing, unlocking, extraction, ejection, cocking). The first action taken with malfunction is usually called immediate action. This is a very basic movement that solves most malfunctions. Immediate action for a pistol is tap, rack, bang. The user will start with a magazine loaded with the practice round 104. The magazine will be seated in the pistol with no practice round 104 chambered. On the start signal from the electronic device 102, the user will draw his pistol and press the trigger on an empty chamber. This will simulate a FTF (failure to fire). At this point the user will tap the base of the seated magazine to ensure it is properly seated, then the user will rack the slide to clear any ammunition that may be causing the malfunction and also chambering the practice round 104 into the pistol. Then the user will press the trigger to cause the firing pin to strike the practice round 104. This drill will give the user a time for correcting the FTF.

Exemplary Practice Drill—Transitions

Transitions are for when the primary weapon system (usually a rifle or shotgun) goes down and the user needs to transition to a secondary weapon (usually a pistol). When the user sets up to practice transitions, the user will have an empty chamber on the primary system and the practice round 104 chambered into the secondary weapon. On the start signal generated from the electronic device 102, the user will press the trigger on the primary weapon which will result in a FTF. The user will then use their weak hand to guide the weapon off to their non-firing side, and, at the same time, with their strong hand the user will draw the secondary weapon. The user will bring the secondary weapons up to the target and press the trigger which causes the firing pin to strike the practice round 104. This drill provides a user with the time to conduct a transition drill. [End of examples.]

Figure 11:
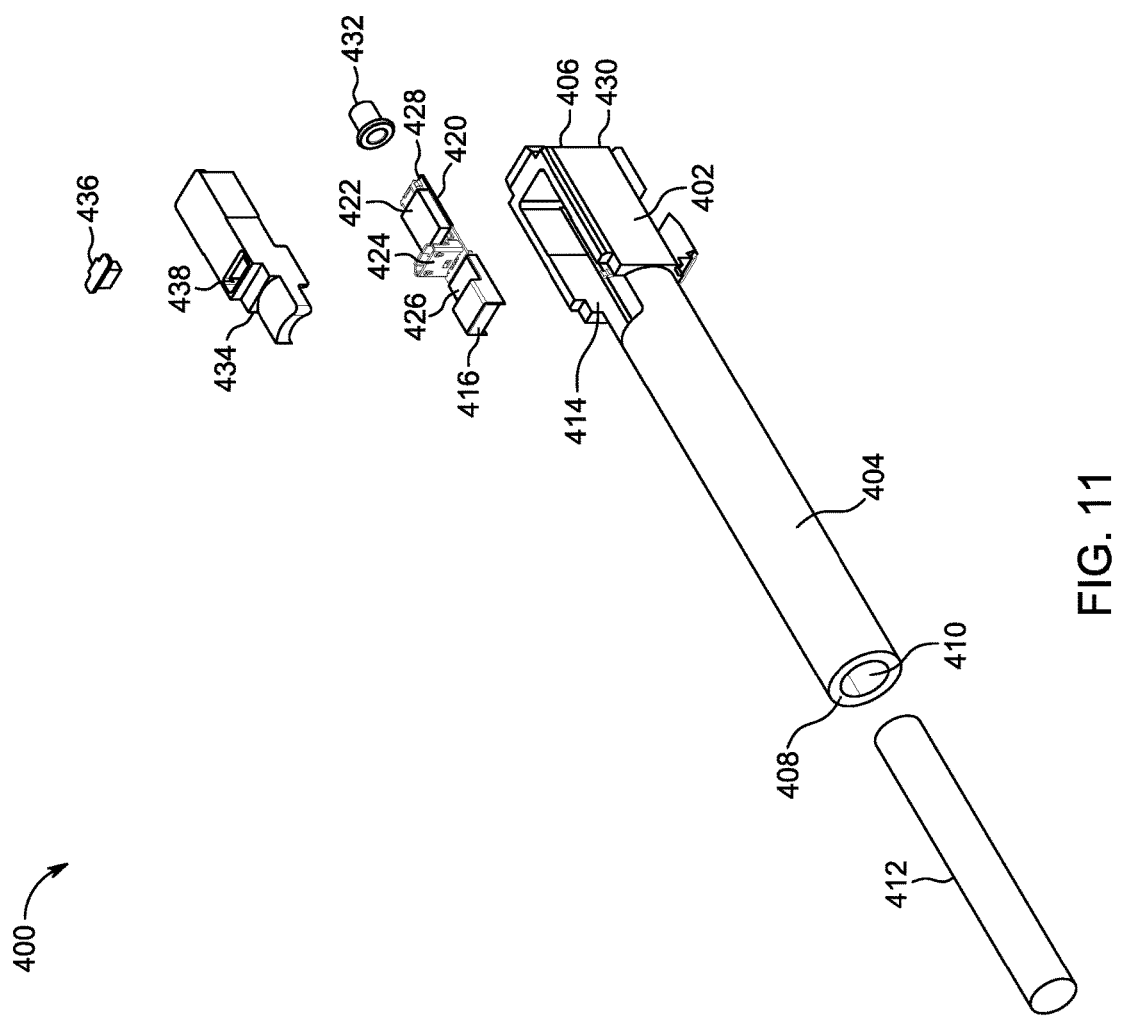
FIG. 11 is an exploded isometric view of a practice barrel assembly according to an embodiment of the present disclosure.
Figure 12:
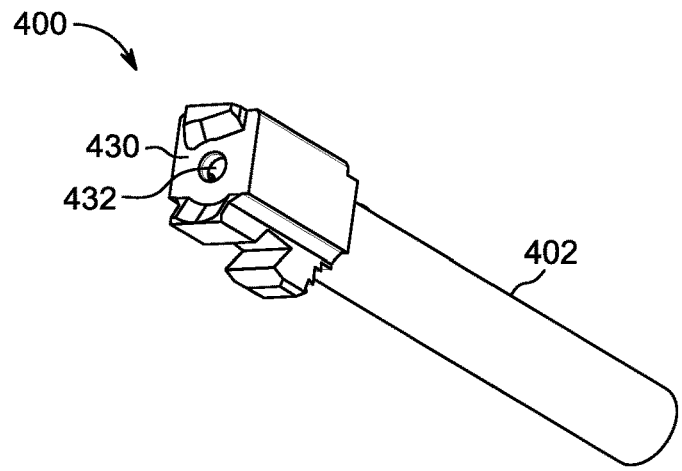
FIG. 12 is a bottom isometric view of the practice barrel assembly shown in FIG. 11.
Figure 13:
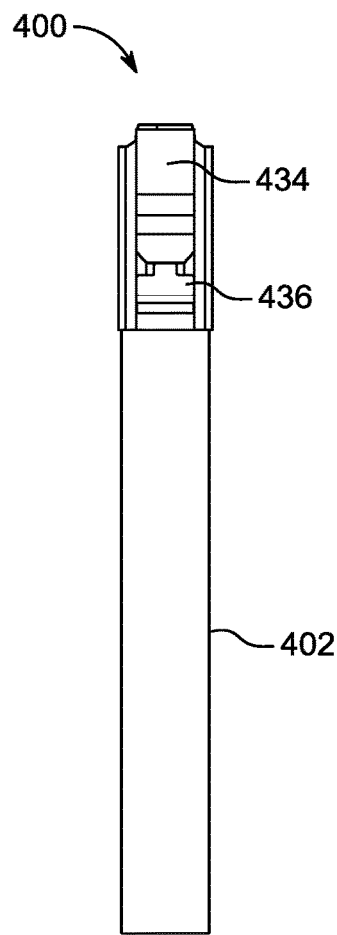
FIG. 13 is a top view of the practice barrel assembly shown in FIG. 11.

Referring now to FIG. 11, there is depicted an exploded view of a practice barrel assembly 400 according to an embodiment of the present disclosure. The assembly 400 may include a barrel body 402 extending from a proximal end 406 to a distal end 408. The barrel body 402 may include an elongated barrel portion 404. The barrel portion 404 may include a bore 410. The bore 410 is configured and dimensioned to receive a barrel weight 412. It will be appreciated that the barrel weight 412 is utilized with the barrel assembly 400 in order to replicate the weight and feel of a real barrel.

Formed in the barrel assembly 400 is a cavity 414. The cavity 414 is sized to receive an electronic component 416. The electronic component 416 includes a circuit board 420 having a multi-functional processing module 422 mounted thereon. In an embodiment, the module 422 incorporates an antenna, a radio transmitter and receiver, a processor, and a memory. Loaded in the memory is program having computer-readable instructions that cause the processor, when executing the instructions, to preform the functionality described herein. A commercially available device suitable for use as the module 422 is the Simblee module by RF Digital.

Connected to the circuit board 420 is also a charging port 424 that is operable to allow a battery 426 mounted on the board 420 to be charged. It will be appreciated that the battery 426 provides power to the components of the board 420. Connected to the board 420 and in communication with the processor of the module 422 is a firing pin strike sensor 428. The sensor 428 may extend through an orifice (not visible) defined in a flat proximal surface 430 of the barrel body 402. It will be appreciated that the firing pin strike sensor 428 is located on the flat proximal surface 430 of the barrel body 402 in the conventional position of a primer for a live round. Thus, the firing pin strike sensor 428 is able to detect a strike of the firing pin of a firearm. In an embodiment, the sensor 428 is a switch that is depressed in response to the strike of the firing pin. In an embodiment, the sensor 428 comprises a piezoelectric material. In an embodiment, the sensor 428 comprises a microphone. It will be appreciated that the sensor 428 is any device capable of detecting and reporting the strike of a firing pin to the module 422. The sensor 428 may be protected by a flexible polyurethane member 432 that extends over the orifice (not visible) in the flat proximal surface 430 of the barrel body 402.

The barrel assembly 400 further includes a cap 434 for enclosing the cavity 414 formed in the barrel body 402. The cap 434 may be secured to the barrel body 402 using a snap-fit connection or fasteners. The cap 434 may further include an opening 438 for allowing access to the charging port 424. A removable plug 436 is removably insertable into the opening 438.

Referring now to FIGS. 11-15, where like reference numerals depict like components, the practice barrel assembly 400 is configured and dimensioned to interchangeably replace the factory barrel of a firearm to allow safe firearm training. In an embodiment, the module 422 may operate in the same manner as the module 222 described above. For example, in response to the processor of the module 422 receiving a signal indicating that the firing pin of the firearm has struck the firing pin strike sensor 428, the module 422 transmits a wireless signal to the electronic device 102. In response to the receipt of the signal from the module 422, the electronic device 102 stops an electronic timer running on the electronic device 102. In an alternative embodiment, the module 422 stops an electronic timer running on the processor of the module 422 in response to a signal from the firing pin strike sensor 428 and the transmits the elapsed to the electronic device 102. Thus, it will be appreciated that the signal from the firing pin strike sensor 428 may stop an electronic timer running locally on the module 422 or on the remote electronic device 102. If the electronic timer is local, the module 222 may store a log of all previously recorded times. The log may then be uploaded to the electronic device 102 from the module 422. It will be appreciated that the practice barrel assembly 400 does not utilize a practice round. Instead, the electronic components, similar to those found in a practice round, are integrated into the practice barrel assembly 400.

Below is a discussion of various practice drills that may be performed using the practice barrel assembly 400. It will be appreciated that the present disclosure may be utilized with any number of practice drills now known or known in the future.

Exemplary Practice Drill—Draw Stroke

The end user replaces the factory barrel out of a pistol and replaces it with the barrel assembly 400. When the barrel assembly 400 is installed it is turned ON by activating the sensor 428 by hand or by pulling the trigger (pulling the trigger releases the striker/firing pin which is detected by the sensor 428). The sensor 428 wakes up the processing module 422 and establishes a connection between the electronic device 102 and the barrel assembly 400. After the barrel assembly 400 has been turned ON and a connection established with the electronic device 102, the pistol is placed in a holster. After establishing all the desired settings on the electronic device 102, the end user pushes the start button. When the app/phone beeps, the end user draws the pistols and pulls the trigger. In response to the trigger pull, the barrel assembly 400, or rather the module 422, sends a signal to the electronic device 102. The receipt of the signal stops a timer. The elapsed time between the beep and the pulling of the trigger is displayed and recorded on the electronic device 102.

Exemplary Practice Drill—Magazine Change

The installation of the barrel assembly 400 is the same as described above in the draw stroke example. There are several types and methods available to preform a magazine change but all of them require the end user to take out the current magazine and replace it with another magazine. The end user can set the pistol up to where there is an empty magazine seated in the magazine well, the slide is locked to the rear, a spare or replacement magazine is placed where ever the end user would like. The barrel assembly 400 is turned on and the start button is pushed on the electronic device 102. The electronic device 102 will beep and the end user will push the magazine release button on the pistol, dropping the magazine out of the pistol. The end user will secure the replacement magazine and insert it into the pistol, then either depressing the slide lock/slide release or pull the slide to rearward which releases the slide lock/slide release allowing the slide to go forward and lock itself back into battery. The end user then pulls the trigger and the time required to preform the magazine change and pulling the trigger is displayed and recorded on the electronic device.

Exemplary Practice Drill—Malfunction Drills.

The installation of the barrel assembly 400 remains the same as described in the draw stroke example above. A malfunction is a disruption in the eight cycles of function (firing, unlocking, extraction, ejection, cocking, feeding, chambering and locking). Immediate action for a stoppage in firing a pistol is tap, rack, bang. The end user opens and presses start on the electronic device 102. Upon hearing the beep, the end user taps the bottom of the magazine to ensure the magazine is properly seated, then racks the slide to the rear and releases it to simulate ejecting a bad round. The user then pulls the trigger. The time to conduct immediate action is displayed and recorded on the electronic device 102. There are numerous types of malfunctions and many different ways to clear each type of malfunction. The training device displays and records the time from the beep and the clearing of any malfunction that ends with the pulling of the trigger.

Exemplary Practice Drill—Transition Drills.

The installation of the barrel assembly 400 remains the same as described above in the draw stroke example. A transition drill is when the end user switches from a primary weapon to a secondary weapon system. This is done when a primary system is out of ammunition or suffers from a malfunction. The end user will start with the primary weapon system in his hands as if he were firing that system.

After pressing the start button on the electronic device 102, the end user hears the beep. Then using any one of the many techniques to rotate the primary weapon system out of the end user's way, the end user reaches toward the secondary weapon system, i.e, the pistol with barrel assembly 400 installed, and draws the pistol and pulls the trigger. The time to conduct this drill is displayed and recorded on the electronic device 102. [End of Examples.]

An embodiment of the present disclosure provides a practice round for use with a firearm having a chamber and a firing pin, said practice round comprising: a casing configured and dimensioned to be removably inserted into the chamber of the firearm; a processor disposed within the casing; and a firing pin strike sensor in communication with said processor; wherein said firing pin strike sensor is configured to send a signal to said processor in response to an impact of the firing pin of the firearm. The practice round of the above embodiment, wherein the processor is configured to provide an electronic timer, wherein the processor is further configured to stop the electronic timer in response to the signal from the firing pin strike sensor. The practice round of the above embodiment, wherein the processor is further configured to start the electronic timer in response to receiving a wireless signal from a remote electronic device. The practice round of the above embodiment, further comprising a memory in communication with said processor, wherein said processor is further configured to store measured times in said memory as determined by said electronic timer. The practice round of the above embodiment, further comprising a radio transmitter disposed within the casing, wherein the radio transmitter is in communication with said processor, wherein the processor is configured to transmit a wireless signal using the radio transmitter to a remote electronic device in response to the signal from the firing pin strike sensor. The practice round of the above embodiment, wherein the firing pin strike sensor comprises one of a mechanical switch, a pressure switch and a piezoelectric material. The practice round of the above embodiment, further comprising a battery disposed within said casing and a battery charging port for charging said battery. The practice round of the above embodiment, further comprising a radio transmitter and receiver disposed within said casing, wherein the radio transmitter and receiver is in communication with said processor.

The present disclosure provides a system for performing training drills with a firearm, the firearm having a chamber and a firing pin, the system comprising:
 a practice round comprising:
  a casing configured and dimensioned to be removably inserted into the chamber of the firearm,
  a processor disposed within the casing, and
  a firing pin strike sensor in communication with said processor,
  wherein said firing pin strike sensor is configured to generate a signal in response to an impact of the firing pin of the firearm;
 an electronic device comprising:
  a processor configured to receive user input from a user interface, and
  wherein said processor is further configured to generate a start signal in response to said user input; and
 an electronic timing device configured to (i) start an electronic timer in response to the start signal generated by the processor of the electronic device, and (ii) stop the electronic timer in response to the signal from said firing pin strike sensor.

The system of the above embodiment, wherein the electronic timing device is disposed within the casing of the practice round. The system of the above embodiment, wherein the electronic timing device comprises the processor of the electronic device. The system of the above embodiment, wherein the practice round further comprises a radio transmitter and receiver disposed within the casing. The system of the above embodiment, wherein the practice round and the electronic device communicate using short range radio frequency transmissions. The system of the above embodiment, wherein the electronic device is a smart phone.

The present disclosure provides a method of performing a practice drill with a firearm, the firearm having a chamber, firing pin, and a trigger, said method comprising: loading a practice round into the chamber of the firearm, the practice round having a firing pin strike sensor; starting an electronic timer; performing the practice drill with the firearm that ends with the firing pin striking the practice round; generating a signal from the firing pin strike sensor in response to the firing pin striking the practice round; stopping the electronic timer in response to the signal from the firing pin strike sensor; and displaying on a display an elapsed time between the start and stop of the electronic timer. The method above, wherein the practice round comprises a processor in communication with the firing pin strike sensor. The method above, wherein the practice round further comprises a rechargeable battery. The method above, wherein the practice round further comprises a radio transmitter and receiver. The method above, wherein the firing pin strike sensor is one of a mechanical switch, a pressure switch, and a piezoelectric switch. The method above, wherein the practice drill is one of a quick-draw drill, a malfunction clearance drill, a transition drill, and a magazine change drill.

An embodiment of the present disclosure provides a practice round for use with a firearm having a chamber and a firing pin, said practice round comprising: casing configured and dimensioned to be removably inserted into the chamber of the firearm; the casing having a proximal end surface; a processor disposed within the casing; a firing pin strike sensor in communication with said processor; and a radio transmitter in communication with said processor; wherein said firing pin strike sensor is configured to send a signal to said processor in response to an impact of the firing pin of the firearm on the proximal end surface of the casing; wherein said processor is configured to cause said radio transmitter to transmit a wireless signal in response to receiving the signal from the firing pin strike sensor. The practice round of the embodiment, wherein the firing pin strike sensor is disposed on the proximal end surface of the casing. The practice round of the embodiment, wherein the firing pin strike sensor comprises a switch. The practice round of the embodiment, wherein the switch is one of a mechanical switch or a pressure switch. The practice round of the embodiment, wherein the firing pin strike sensor comprises a piezoelectric material. The practice round of the embodiment, further comprising a battery disposed within the casing. The practice round of the embodiment, further comprising a battery charging port for charging said battery. The practice round of the embodiment, wherein the casing is one of injected molded and die cast.

An embodiment of the present disclosure provides a system for performing training drills with a firearm, the firearm having a chamber and a firing pin, said system comprising: a practice round comprising: a casing configured and dimensioned to be removably inserted into the chamber of the firearm, the casing having a proximal end surface, a processor disposed within the casing, a firing pin strike sensor in communication with said processor, and a radio transmitter in communication with said processor, wherein said firing pin strike sensor is configured to send a signal to said processor in response to an impact of the firing pin of the firearm on the proximal end surface of the casing, wherein said processor is configured to cause said radio transmitter to transmit a wireless signal in response to receiving the signal from the firing pin strike sensor; and an electronic device comprising: a processor configured to provide an electronic timer, a user interface in communication with said processor and operable to receive user input, a radio receiver in communication with said processor, and a display, wherein said processor is further configured to (i) start said electronic timer in response to user input received through the user interface, (ii) stop the electronic timer in response to receiving the wireless signal from the practice round, and (iii) display an elapsed time between the start and the stop of the electronic timer on the display. The embodiment of the present disclosure further provides wherein the processor of the electronic device is further configured to provide a time delay prior to the start of the electronic timer. The embodiment of the present disclosure further provides wherein the processor is further configured to vary a length of the time delay in response to user input. The embodiment of the present disclosure further provides wherein the electronic device is a smart phone. The embodiment of the present disclosure further provides wherein the firing pin strike sensor is disposed at the proximal end surface of the casing. The embodiment of the present disclosure further provides wherein the firing pin strike sensor is one of a mechanical switch, a pressure switch, and a piezoelectric switch.

An embodiment of the present disclosure provides a method of performing a training drill with a firearm, the firearm having a chamber, firing pin, and a trigger, said method comprising: loading a practice round into the chamber of the firearm; starting an electronic timer on an electronic device; performing the training drill with the firearm that ends with pulling the trigger on the firearm such that the firing pin strikes the practice round; generating a strike signal from a firing pin strike sensor in response to the firing pin striking the practice round; transmitting a wireless stop signal from a radio transmitter in response to the strike signal; receiving the wireless stop signal at the electronic device; stopping the electronic timer on the electronic device in response to the wireless stop signal; and displaying on a display an elapsed time between the start and stop of the electronic timer. The embodiment of the present disclosure further provides the method wherein the practice round comprises a casing configured and dimensioned to be removably inserted into the chamber of the firearm, the casing having a proximal end surface and a processor, wherein the processor is in communication with the firing pin strike sensor and the radio transmitter. The embodiment of the present disclosure further provides the method wherein the practice round further comprises a rechargeable battery. The embodiment of the present disclosure further provides the method wherein the electronic device comprises a smart phone. The embodiment of the present disclosure further provides the method wherein the firing pin strike sensor is one of a mechanical switch and a pressure switch. The embodiment of the present disclosure further provides the method wherein the training drill is one of a quick-draw drill, a malfunction clearance drill, a transition drill, and a magazine change drill.

In an embodiment, the present invention provides a system for conducting practice drills using a firearm, the firearm having a factory barrel and a firing pin, said system comprising: a practice barrel configured and dimensioned to interchangeably replace the factory barrel of the firearm, the practice barrel having a chamber; and a practice round dimensioned to be removably inserted into the chamber of the practice barrel; wherein the practice round comprises a radio transmitter for sending a signal to a remote electronic device. The aforementioned system, wherein the practice barrel is formed of a plastic or a polymer. The aforementioned system, wherein the practice barrel comprises a weight to simulate the weight of the factory barrel. The aforementioned system, wherein the practice barrel is formed of metal. The aforementioned system, wherein the practice barrel comprises one or more open ports in communication with the chamber. The aforementioned system, wherein the chamber of the practice barrel varies in at least one dimension from the chamber of the factory barrel. The aforementioned system, wherein the at least one dimension is a chamber length or a chamber diameter. The aforementioned system, wherein the practice round further comprises: a casing; a processor disposed within the casing; and a firing pin strike sensor in communication with said processor; wherein said firing pin strike sensor is configured to send a signal to said processor in response to an impact of the firing pin of the firearm.

In an embodiment, the present invention provides an apparatus for practicing firearm training drills, said apparatus comprising: a firearm having its factory barrel replaced by a practice barrel; and a radio transmitter located within the practice barrel; the radio transmitter transmitting a signal to a remote electronic device in response to a dry fire of the firearm. The aforementioned apparatus, wherein the practice barrel is formed of a plastic or a polymer. The aforementioned apparatus, wherein the practice barrel comprises a weight to simulate the weight of the factory barrel. The aforementioned apparatus, wherein the practice barrel is formed of metal. The aforementioned apparatus, wherein the practice barrel comprises a chamber and one or more open ports in communication with the chamber. The aforementioned apparatus, wherein the practice barrel comprises a chamber and wherein the chamber of the practice barrel varies in at least one dimension from a chamber of the factory barrel. The aforementioned apparatus, wherein the at least one dimension is a chamber length or a chamber diameter. The aforementioned apparatus, further comprising a practice round having a casing installed in the practice barrel, wherein the radio transmitter is disposed within the casing of the practice round. The aforementioned apparatus, wherein the practice round further comprises: a processor disposed within the casing; and a firing pin strike sensor in communication with said processor; wherein said firing pin strike sensor is configured to send a signal to said processor in response to an impact of the firing pin of the firearm.

In an embodiment, the present invention provides a method of performing firearm practice drills using a firearm, said firearm having a factory barrel for firing live ammunition, said method comprising: replacing the factory barrel of the firearm with a practice barrel; performing a practice drill that includes dry firing the firearm; transmitting a radio signal from the practice barrel to a remote electronic device in response to dry firing the firearm; and displaying an elapsed time for performing the practice drill on the remote electronic device. The aforementioned method, further comprising loading a practice round having a casing into a chamber of the practice barrel, wherein a radio transmitter is disposed within the casing of the practice round. The aforementioned method, wherein the remote electronic device is a smart phone.

Those having ordinary skill in the relevant art will appreciate the advantages provide by the features of the present disclosure. For example, the present disclosure provides a system for allowing a user to practice firearm training drills using a practice round and an electronic device, such as a smartphone. It is further a feature of the present disclosure to provide a practice round that is able to send radio frequency signals to an electronic device in response to a firing pin striking the round while it is loaded within the chamber of a firearm. It is further a feature of the present disclosure to provide a timing device for allowing a user to perform training drills with a firearm than end with a trigger pull. It is a further feature of the present disclosure, in accordance with one aspect thereof, to provide a practice round that includes a radio transmitter for sending signals to an electronic device.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A system for conducting practice drills using a firearm, the firearm having a factory barrel and a firing pin, said system comprising:
    a practice barrel assembly configured and dimensioned to interchangeably replace the factory barrel of the firearm;
    the practice barrel assembly having a barrel body;
    a cavity formed in the barrel body of the practice barrel assembly;
    a processor located within the cavity in the barrel body of the practice barrel assembly;
    a radio transmitter located within the cavity and in communication with the processor; and
    a firing pin strike sensor in communication with the processor;
    wherein the processor is programmed to cause the radio transmitter to transmit a wireless signal to a remote electronic device in response to the firing pin strike sensor detecting a dry fire of the firing pin.

2. The system of claim 1, wherein the barrel body comprises a weight.

3. The system of claim 1, wherein the practice barrel assembly further comprises a cap that is removably installable over the cavity.

4. The system of claim 1, further comprising a rechargeable battery disposed within the practice barrel assembly, the rechargeable battery providing power for the processor.

5. The system of claim 4, further comprising a charging port for recharging the rechargeable battery.

6. The system of claim 1, further comprising a flexible member disposed over the firing pin strike sensor.

7. The system of claim 6, where the flexible member is formed of polyurethane.

8. An apparatus for practicing firearm training drills, said apparatus comprising:
    a firearm having its factory barrel replaced by a practice barrel assembly; and
    a processor and radio transmitter located within a cavity formed in the practice barrel assembly;
    wherein the processor causes the radio transmitter to transmit a signal to a remote electronic device.

9. The apparatus of claim 8, wherein the practice barrel assembly comprises a barrel body that is formed of a plastic or a polymer.

10. The apparatus of claim 8, wherein the practice barrel assembly comprises a weight to simulate the weight of the factory barrel.

11. The apparatus of claim 8, wherein the processor causes the radio transmitter to transmit a signal to the remote electronic device in response to a dry fire of the firearm.

12. The apparatus of claim 8, wherein the processor is programmed to provide an electronic timer.

13. The apparatus of claim 8, further comprising a firing pin strike sensor in communication with the processor.

14. The apparatus of claim 8, further comprising a battery to provide power to the processor.

15. The apparatus of claim 8, wherein the firearm is a pistol.

16. The apparatus of claim 8, wherein the remote electronic device is a smart phone.

17. A method of performing firearm practice drills using a firearm, said firearm having a factory barrel for firing live ammunition, said method comprising:
    replacing the factory barrel of the firearm with a practice barrel assembly, the practice barrel assembly comprising a processor and a radio transmitter;
    performing a practice drill that includes dry firing the firearm;
    transmitting a radio signal from the radio transmitter to a remote electronic device in response to a dry fire of the firearm; and
    displaying an elapsed time for performing the practice drill on the remote electronic device.

18. The method of claim 17, further comprising causing the processor to track an elapsed time of the practice drill.

19. The method of claim 17, wherein the remote electronic device is a smart phone.

* * * * *